United States Patent [19]

Kaufman

[11] 4,377,844
[45] Mar. 22, 1983

[54] ADDRESS TRANSLATOR

[76] Inventor: Marc Kaufman, 14100 Donelson Pl., Los Altos Hills, Calif. 94022

[21] Appl. No.: 122,836

[22] Filed: Feb. 20, 1980

[51] Int. Cl.³ .................................................. G06F 7/00
[52] U.S. Cl. .................................................... 364/200
[58] Field of Search .......................... 364/200 MS File

[56] References Cited

U.S. PATENT DOCUMENTS

| 3,949,378 | 4/1976 | Crabb et al. | 364/200 |
| 4,031,514 | 6/1977 | Kihara | 364/200 |
| 4,128,875 | 12/1978 | Thurber et al. | 364/200 |
| 4,155,119 | 5/1979 | DeWard et al. | 364/200 |

Primary Examiner—Joseph M. Thesz
Attorney, Agent, or Firm—Warren M. Becker

[57] ABSTRACT

A memory addressing apparatus (1,20,90) is described comprising a circuit (5,26,96) responsive to a current external memory address on an input line (2,21,91) and a signal generated by an auxiliary memory circuit (8,29,93) for providing a current internal memory address for addressing an internal memory (15,19,101). For maximum program security, the above described components are all located in a single integrated circuit package.

8 Claims, 5 Drawing Figures

ADDRESS TRANSLATOR

BACKGROUND OF THE INVENTION

The present invention relates to digital memories and memory addressing circuits in general and in particular to an address translating apparatus for translating addresses from a conventional address register in a conventional central processing unit (CPU) to a "hidden" or "internal" address for addressing an internal memory.

Internal memories typically comprise conventional read/write memories, random access memories (RAM's) and read-only memories (ROM's). Among the memories listed, ROM's are frequently used for storing computer programs, data lists and other similar matter which are not intended to be changed. As with other conventional non-volatile recording media, such as paper tape, magnetic tape and magnetic discs, ROM's also provide a convenient means for permanently storing and disseminating computer programs, data lists and the like.

With an ever increasing use of computers in business and industry, there has been a corresponding increase in the dissemination of particular programs using various types of non-volatile memories including ROM's. With the increased dissemination of particular programs, there has also been an increase in the unauthorized copying of the programs which is causing serious and considerable economic loss to those who have invested great amounts of time and money in the development of the programs.

Like other recorded media, such as paper tape, magnetic tape and magnetic discs, ROM's can also be copied directly. Their structure, however, makes their mass programming usually prohibitively expensive.

The considerable expense connected with direct copying of ROM's, however, has been found not to be an insurmountable obstacle. Conventional ROM's, like many other types of prerecorded media, provide independent and random access to any location within the ROM's. That is, every access is independent of every other access. In those cases where it becomes prohibitively expensive to duplicate a ROM, this independent and random access makes it a relatively simple matter using conventional means, to read out a program from the ROM and to transfer the data read to a tape or disc. Later, after reloading the program into another type of memory, such as a random access memory (RAM), the program may be used in any conventional manner.

In the past, several methods have been employed in an attempt to prevent the unauthorized duplication of a computer program or data list stored in a ROM. For example, in one such method there is provided in a ROM program initial security instructions. When an unauthorized user reads out the ROM the security instructions are transferred together with the other contents of the ROM to a RAM or other read/write memory which is typically used during the data readout and transfer operation. Thereafter when the instructions are executed from the RAM or other read/write memory, they store zeros or other extraneous information in some or all of the program locations in the memory. This is possible because in transferring the contents of a ROM to a conventional read/write memory, as by a sequential addressing of the ROM, the addresses of the contents of the ROM are necessarily preserved in the conventional read/write memory. This results, in effect, in a ROM program which when duplicated in a conventional read/write memory is a program which destroys itself.

One of the problems associated with the above described method for frustrating unauthorized duplication of ROM programs is that the security method itself can be frustrated by an unauthorized user. This can be done by the user simply obtaining a printout of the program by conventional means and by manual or automatic conventional disassembly procedures, detecting and rendering ineffective the extraneous security instructions.

Another disadvantage of conventional memories and memory addressing apparatus is the limited address space available in many addressing apparatus. This is because the limited address space severely limits the size of the programs and data storage that can be used with the addressing apparatus.

Because computer programs comprise sequences of instructions which are generally written in successive memory locations, it is possible to take advantage of this fact and retrieve a large program with relatively few addresses. Principally, the only addresses that are required are those associated with initial and conditional jump instructions. For this reason, auxiliary addressing apparatus can be used advantageously.

SUMMARY OF THE INVENTION

In view of the foregoing a principal object of the present invention is an internal memory and memory addressing apparatus and method in which there is provided means responsive to a current external memory address and a signal generated in response to a previous memory address for providing a current internal memory address for addressing the internal memory.

Another object of the present invention is an internal memory and memory addressing apparatus and method in which there is provided a means capable of changing an internal memory address independently of an external memory address with each succeeding interrogation of the memory.

Still another object of the present invention is an internal memory and memory addressing apparatus and method in which there is provided means for executing a program from the memory using internal addresses generated from initial external addresses.

Still another object of the present invention is an internal memory and memory addressing apparatus and method in which there is provided an auxiliary memory responsive to either prior internal memory addresses or prior external memory addresses for generating current internal memory addresses.

Still another object of the present invention is a memory and addressing apparatus and method in which there is provided a plurality of register means for storing return addresses for use in programs having multiple internal subroutines.

Still another object of the present invention is a memory and memory addressing apparatus and method which permits use of memories having a capacity which exceeds the addressing space of the central processing unit with which the memory and addressing aparatus is used.

Still another object of the present invention is a memory and memory addressing apparatus and method as described above in which the memory and memory addressing apparatus are integrated in the same integrated circuit package.

In accordance with the above objects there is provided an apparatus which provides, when properly programmed, a predetermined sequence of inputs in response to predetermined sequence of input addresses. All other sequences of input addresses will provide no output or an output which in unusable. This allows the execution of a program in the internal memory while preventing its being copied by conventional methods and means.

With the internal memory and memory addressing apparatus and method according to the present invention integrated in the same integrated circuit package, it becomes nearly impossible without the use of highly sophisticated equipment, such as a microprobe or electronic scanning microscope, to copy a program from the memory. Without the use of a microprobe, microscope or the like, in order to obtain a complete copy of the program in the absence of any information as to whether or not two or more conditional jumps are in series, it is necessary to traverse every possible execution path. To traverse every possible execution path requires, at a minimum, $2^n$ executions of the program where n is the number of conditional jump instructions encountered in an execution of the program. With even a few loops in the code, a considerable number of sequences would need to be tried. For example, in a program containing five conditional jumps, the copier would have to execute the program thirty-two times to traverse every path. If the program contained fifty conditional jumps, not an unusually high number, traversing every path could take several years using current technology. For these reasons, keeping the structure of a program and, in particular, the arrangement of conditional jumps secret is very desirable for preventing unauthorized duplication of a program.

BRIEF DESCRIPTION OF THE DRAWING

The above and other objects, features and advantages of the present invention will become apparent from the following detailed description of the accompanying drawing in which.

DETAILED DESCRIPTION OF THE DRAWING

Figure 1:
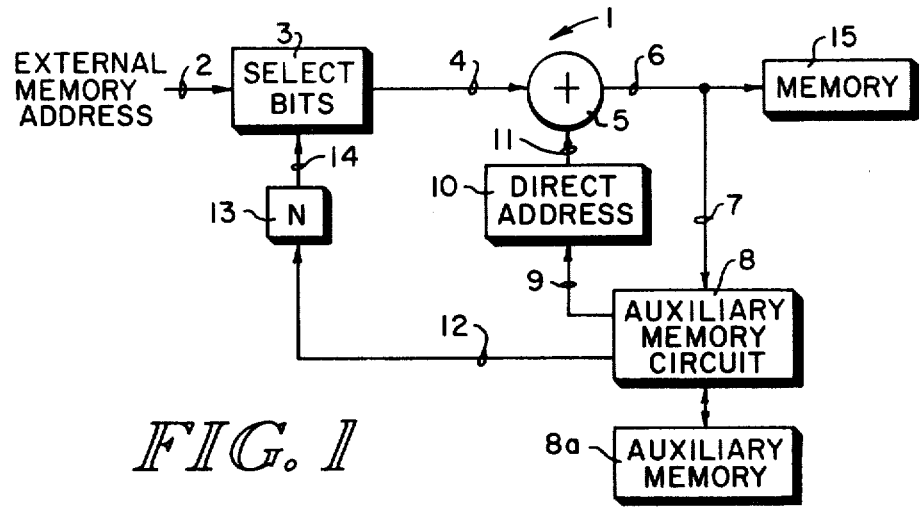
FIG. 1 is a block diagram of an embodiment of the present invention in which a previous internal memory address is used in conjunction with selected bits of a current external memory address for generating a current internal memory address.

Referring to FIG. 1 there is provided in an embodiment of the present invention, a memory addressing apparatus designated generally as 1. In the apparatus 1 there is provided an input line 2. The input line 2 is provided for connecting the apparatus 1 to an external source of memory addresses such as, for example, a conventional address register of a central processing unit (CPU) (not shown). Coupled to the line 2 there is provided a select bits circuit 3. The select bits circuit 3 is provided for selecting in response to an input control signal none, one or more bits from an address provided from the external source of memory addresses coupled to the input line 2. Coupled to the select bits circuit 3 by a line 4 is a first input of an adding circuit 5. An output of the adding circuit 5, an internal address, is coupled by means of a line 6 to an addressable internal memory circuit means 15 and by means of a line 7 to an auxiliary memory circuit means 8 which includes therein an addressable memory 8a. Coupled by means of a line 9 to a first output of the auxiliary circuit means 8 there is provided a direct address register 10. The direct address register 10 is coupled by means of a line 11 to a second input of the adding circuit 5. The register 10 is coupled to the adding circuit 5 for providing to the adding circuit 5 a direct address provided from the auxiliary memory circuit means 8 in response to a previous internal address. A second output of the auxiliary memory circuit means 8 is coupled by means of a line 12 to an input of an N bits circuit 13. The N bits circuit 13 is coupled by means of a line 14 to a second input of the select bits circuit 3. The N bits circuit 13 is provided for providing the above described control signal to the select bits circuit 3 for selecting none, one or more bits from an external address on the line 2 in response to a signal from the auxiliary memory circuit means 8.

In practice, the internal memory 15 coupled to the output line 6 of the adding circuit means 5 and the memory 8a in the auxiliary memory circuit means 8 are programmed concurrently. The concurrent programming of the internal memory 15 and the memory 8a in the auxiliary memory circuit means 8 provides certain advantages. One of the advantages is that direct addresses for the register 10 generated by the auxiliary memory circuit means 8 in response to previous internal memory addresses may be chosen so that repetitious inputs of the same external memory address on the input line 2 will result in a different internal memory address each time the external memory address is used. Conversely, the direct address may be chosen such that different specific external memory addresses may result in the generation of the same internal memory address. The choice is entirely that of the programmer.

Another advantage of the concurrent programming of the internal memory 15 and the memory 8a in the auxiliary memory circuit means 8 involves the setting of the N bit circuit 13 for selecting none, one or more bits from an external memory address appearing on the line 2.

In course of programming the internal memory 15 and the memory 8a in the auxiliary memory circuit means 8, the programmer is aware of those external memory addresses which are associated with conditional jump instructions. With that knowledge the programmer may, for example, select one, possibly the lowest, bit of the next address following a conditional jump appearing on the input line 2. As will be appreciated, the next address appearing on the input line 2 following a conditional jump instruction, will either be the next succeeding address from the program address register in the CPU or it will be the pointing address associated with the conditional jump instruction to which the CPU would jump if the condition was met. In either case, by limiting the output of the select bit circuit 3 to a single bit of an address following a conditional jump instruction, it is not possible to deviate from a true execution path through the program.

The select bits circuit 3 can also be used for reading data from lists in the internal memory. In these cases, however, the value of N in the N bits circuit 13 is generally greater than unity. For example, if the external memory address seeks to read one of 360 items in a list, the external memory address using a conventional addressing technique would identify the list and the specific item desired in the list. In such a case, the direct address in the direct address register 10 would identify the list and up to nine bits of the external memory address would be selected by the selected bits circuit 3 and the N bits circuit 13 for generating the internal memory address to read the contents of the list item at the desired location in the internal memory 15.

Figure 2:
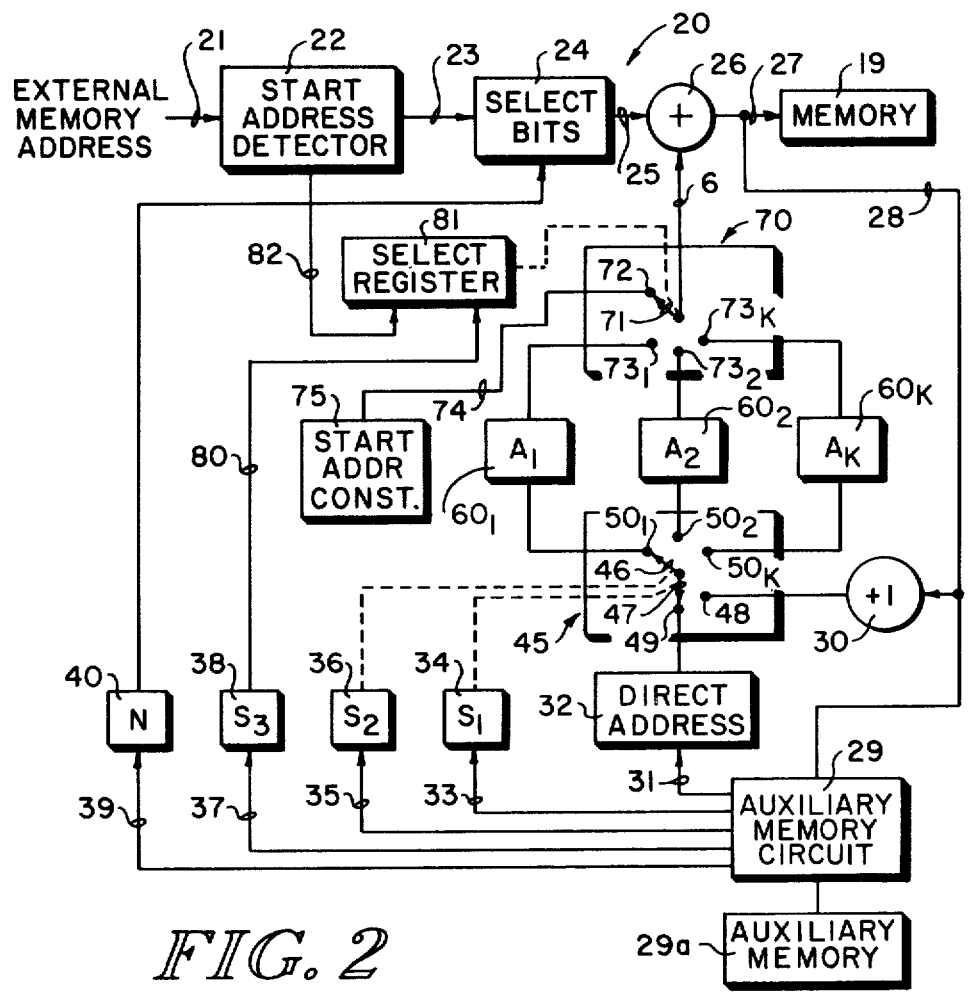
FIG. 2 is an alternative embodiment of the present invention similar to the apparatus of FIG. 1 comprising a plurality of return address registers.

Referring to FIG. 2 there is provided in an alternative embodiment of the present invention, a memory addressing apparatus designated generally as 20. In the apparatus 20 there is provided an external memory input address line 21 for coupling the apparatus 20 to an external source of memory addresses such as the address register in a CPU (not shown).

Coupled to the input line 21 there is provided a start address detector 22. The start address detector 22 is provided for detecting a start address from the source of external memory addresses appearing on the line 21. Coupled to the start address detector 22 by means of a line 23 there is provided a select bits circuit 24. The select bits circuit 24 performs the same function as the select bits circuit 3 described above with respect to the apparatus in FIG. 1. Coupled to the select bits circuit 24 by means of a line 25, there is provided a first input of an adding circuit 26. Coupled to an output of the adding circuit 26 by means of a line 27, there is provided an internal memory 19 and by means of a line 28 an auxiliary memory circuit means 29 and a plus 1 adding circuit 30. In the auxiliary memory circuit means 29 there is provided an addressable auxiliary memory 29a. Coupled to the output of the auxiliary memory circuit means 29 by means of a line 31, there is provided a direct address circuit means 32. Coupled to a second output of the auxiliary memory circuit means 29 by means of a line 33 there is provided a first switch control circuit 34 designated $S_1$. Coupled to a third output of the auxiliary memory circuit means 29 by means of a line 35, there is provided a second switch control circuit 36 designated $S_2$. Coupled to a fourth output of the auxiliary memory circuit means 29 by means of a line 37, there is provided a third switch control circuit 38 designated $S_3$. Coupled to a fifth output of the auxiliary memory circuit means 29 by means of a line 39, there is provided an N bits control circuit 40. The N bits control circuit 40 performs the same function as the N bits control circuit 13 described above with respect to FIG. 1.

The control circuits 34 and 36 are provided for controlling a multiple contact plural wiper switch designated generally as 45. The switch 45 is provided with a pair of controllable contact members 46 and 47 and a plurality of fixed contact members 48, 49, $50_1$, $50_2$, ... $50_k$. The controllable contact member 47 is coupled to the control circuit 34 for selectively coupling the contact 47 and the fixed contacts 48 and 49.

The fixed contact 48 is coupled to the plus one adding circuit 30 and the fixed contact 49 is coupled to the output of the direct address register 32. The controllable contact member 46 is coupled to the control circuit 36 for selective coupling of the controllable contact 46 and the fixed contacts $50_1$, $50_2$, ... $50_k$. The contacts $50_1$, $50_2$, ... $50_k$ are coupled respectively to a corresponding one of a plurality of registers $60_1$, $60_2$, ... $60_k$ for storing a plurality of direct addresses $A_1$, $A_2$, ... $A_k$.

The outputs of the registers $60_1$, $60_2$, ... $60_k$ are coupled to a switch designated generally as 70. In the switch 70 there is provided a controllable contact 71, a fixed contact 72, and a plurality of fixed contacts $73_1$, $73_2$, ... $73_k$. The fixed contact 72 is coupled by means of a line 74 to a start address constant circuit 75. The fixed contacts $73_1$, $73_2$, ... $73_k$ are coupled respectively to the registers $60_1$, $60_2$, ... $60_k$. The controllable contact 71 is coupled by means of a line 76 to a second input of the adding circuit 26.

A select register control circuit 81 for switching the switch 70 is coupled to the switch 70 and to the control circuit 38 by means of a line 80. The select register control circuit 81 is also coupled to the start address detector circuit 22 by means of a line 82.

The operation of the apparatus of FIG. 2 is substantially identical to the operation of the apparatus of FIG. 1 with certain programming flexibility added by the provision of the plurality of the registers $60_1$, $60_2$, ... $60_k$.

As described above with respect to the apparatus of FIG. 1, the internal memory 19 and the auxiliary memory 29a are programmed concurrently. The auxiliary memory 29a in the auxiliary memory circuit means 29 and the internal memory 19 are programmed concurrently so that the auxiliary memory circuit means 29 can provide an appropriate direct address for transmission to the direct address register 32, appropriate control signals for the switch control circuits 34, 36 and 38 and an appropriate control signal for transmission to the N bits control circuit 40 for the selection of bits from external addresses by the select bits circuit 24.

In operation as external memory addresses from an external source of memory addresses appear on the input line 21, the start address detector 22 interrogates each of the addresses until a start address is detected. When a start address is detected, the select register 81 which is enabled by a suitable control signal from the control circuit 38, couples the controllable contact 71 and the fixed contact 72. With the controllable contact 71 coupled to the fixed contact 72, a start address constant from the start address constant circuit 75 is transmitted to the adding circuit 26 via the lines 74 and 6. Depending on the value N in the control circuit 40, none, one or more bits from the start address are selected by the select bits circuit 24 and transmitted to the adding circuit 26. In the adding circuit 26, the selected bits of the external memory address and the start address constant are added for generating on the line 27 an internal memory address for the internal memory 19.

After the initial external memory address and the generation of the initial internal memory address, subsequent internal memory addresses are generated using either a direct address from the direct address register 32 in response to an output from the auxiliary memory circuit means 29 or the sum of the previous internal address and a constant, such as unity, from the plus 1 adder 30. Whether the direct address or the previous internal address is used for the generation of the internal memory address, the selection is determined by the position of the controllable contact 47 in the switch 45.

When the auxiliary memory circuit means 29 provides a signal to the control circuits 34 and 36 for coupling the contact 47 and the fixed contact 49 and the contact 46 and one of the fixed contacts $50_1, 50_2, \ldots 50_k$, in the switch 45, a direct address from the direct address register 32 is stored in one of the registers $60_1, 60_2, \ldots 60_k$, depending on the position of the contact 46 in the switch 45. Similarly, when the program in the auxiliary memory circuit means 29 provides the control signals to the control circuits 34 and 36 for positioning the contacts 46 and 47 of the switch 45 to couple the contact 47 and the fixed contact 48 and the contacts 46 and one of the fixed contacts $50_1, 50_2, \ldots 50_k$, the sum of the previous internal address and the constant, such as plus 1, from the plus 1 adder 30 is stored in one of the registers $60_1, 60_2, \ldots 60_k$ depending upon the position of the contact 46 relative to the fixed contacts $50_1, 50_2, \ldots 50_k$ of the switch 45.

As described above, to couple a particular one of the registers $60_1, 60_2, \ldots 60_k$ to the adding circuit 26, the auxiliary memory circuit means 29 also provides a control signal to the control circuit 38 and the select register circuit means 81 via the lines 37 and 80. The control signal couples contact member 71 of the switch 70 and one of the fixed contacts $73_1, 73_2, \ldots 73_k$.

With the registers $60_1, 60_2, \ldots 60_k$, it is possible with the memory addressing apparatus of the present invention to execute a program with k internal subroutines completely independent of the external CPU by storing the return addresses associated with subroutine jumps in one of the registers. For example, if a programmer is generating internal addresses using the plus one adder 30 and in a particular program there are two subroutine jumps, the programmer might store the output from the adder 30 in register $60_1$ and the return addresses for the two subroutine jumps in register $60_2$ and $60_3$. Under those conditions as the program proceeds, the switches 45 and 70 would be switched to provide the appropriate constant and the desired direct addresses in the selected ones of the registers $60_1, 60_2, \ldots 60_k$, and to provide at the appropriate times the outputs of those registers to the adding circuit 26.

Figure 3:
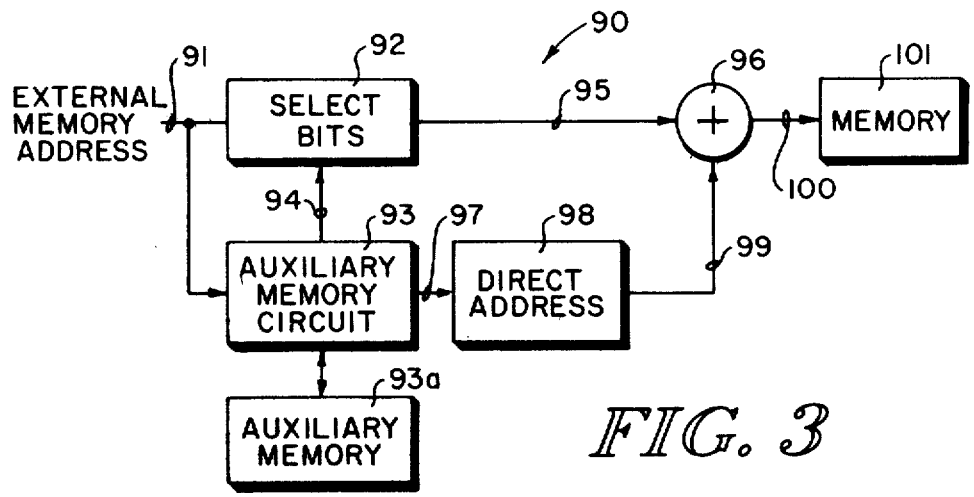
FIG. 3 is a block diagram of another embodiment of the present invention which utilizes a previous external memory address in conjunction with selected bits of a current external memory address for generating a current internal memory address.

Referring to FIG. 3 there is shown an alternative embodiment of the present invention. In the embodiments of FIGS. 1 and 2 there is provided an apparatus in which an internal memory address is generated using a type of feedback circuit in which a current internal memory address is generated using a previous internal memory address in conjunction with a current external memory address. In the apparatus of FIG. 3 there is employed a type of feed-forward circuit in which a previous external memory address is used in conjunction with a current external memory address for generating a current internal memory address.

As seen in FIG. 3 there is provided a memory addressing apparatus designated generally as 90. In the apparatus 90 there is provided an input line 91. The input line 91 is provided for coupling the apparatus 90 to a source of external memory addresses such as an address register in a CPU. Coupled to the input line 91 there is provided a select bits circuit 92 and an auxiliary circuit memory means 93. The auxiliary memory circuit means 93, in which there is provided an auxiliary memory 93a, is also coupled to the select bits circuit 92 by means of a line 94. Coupled by means of a line 95 to the output of the select bits circuit 92 there is provided an adding circuit 96. Coupled to the output of the auxiliary memory circuit means 93 by means of a line 97, there is provided a direct address circuit 98. The output of the direct address circuit 98 is coupled to the adding circuit 96 by means of a line 99.

In operation, as described above with respect to the apparatus of FIGS. 1 and 2, none, one or more selected bits from an external memory address appearing on line 91 are transmitted by the select bits circuit 92 to the adding circuit 96 and combined with a direct address from the direct address circuit 98. As in the apparatus of FIGS. 1 and 2, the direct address stored in the circuit 98 is provided by the auxiliary memory circuit means 93 for generating an internal memory address on a line 100 at the output of the adding circuit 96. As in the case of the memories 15 and 19, the internal address thus generated is provided for addressing an internal memory 101.

For the reasons discussed above in the description of the apparatus of FIGS. 1 and 2, the internal memory 101 and the memory 93a in the auxiliary memory circuit means 93, are programmed concurrently. By concurrent programming of the memory 93a in the auxiliary memory circuit means 93 and the memory 101 the programmer selects the appropriate direct address for modifying the external memory address and the number and position of the bits in the external memory address to be combined with the direct address in the adding circuit 96. For example, after an initial external memory address, none, one or more selected bits of subsequent addresses on the external memory address line 91 are combined with a direct address from the direct address circuit 98 in the adding circuit 96. The particular bits selected from the external address and the character of the direct address is entirely determined by the programmer in the programming of the memory 101 and the memory 93a in the auxiliary memory circuit means 93.

Generally, though not necessarily, in each interrogation of the internal memories 15, 19 and 103, the auxiliary memory circuit means 8, 29 or 93, respectively, determines the direct address from a previous external or internal memory address depending on the embodiment. For this reason, the operation of the apparatus of FIGS. 1, 2, and 3 is dynamic. It is dynamic because the internal memory addresses generated in the apparatus continuously change as a function of the internal operation of the apparatus even in those cases in which the external memory address does not change.

Figure 4:
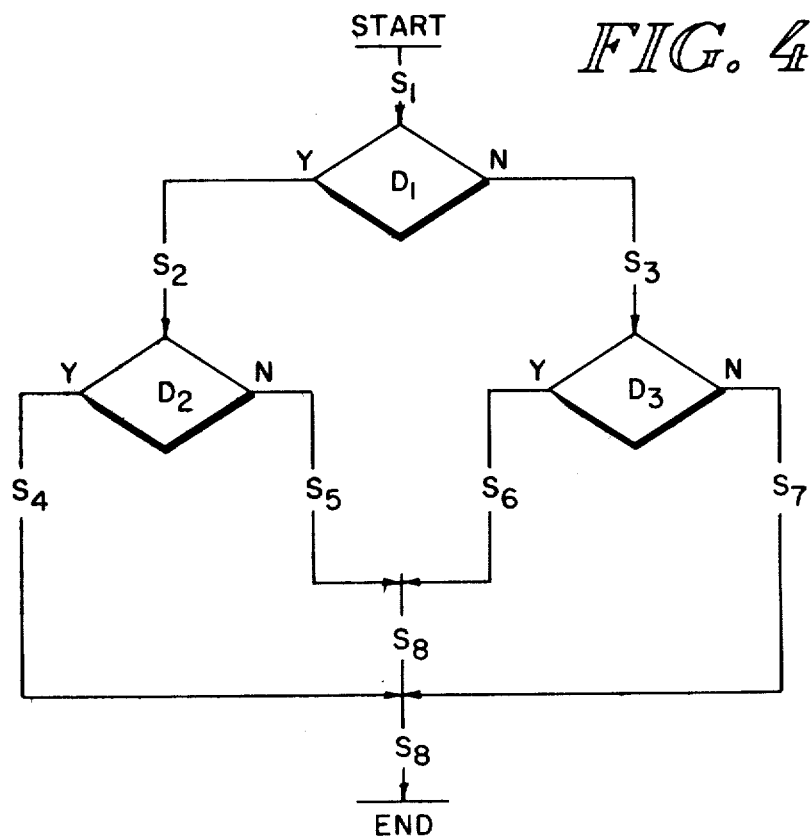
FIG. 4 is a flow diagram of a program with decision points in series and parallel.

Referring to FIG. 4, there is provided in a brief exemplary program, which is described to illustrate the advantages of the present invention, a plurality of statements $S_1, S_2, \ldots S_9$ and a plurality of conditional jumps or decision points $D_1, D_2$ and D. Each decision point has a YES (Y) and a NO (N) output. The statements and decision points are in parallel paths and each path has two decision points in series, e.g. $D_1, D_2$ and $D_1, D_3$. Without a printout of the program, in order for one to see all of the instructions in the entire program, it is necessary to travel every path. In this case, $2^n$ paths where n is the number of parallel paths, e.g. $2^2$ equals 4 paths. On analysis, it can be seen that in a reasonably complex program there may be easily a number of parallel decision points making the number of tests enormously large and prohibitively time consumming.

Figure 5:
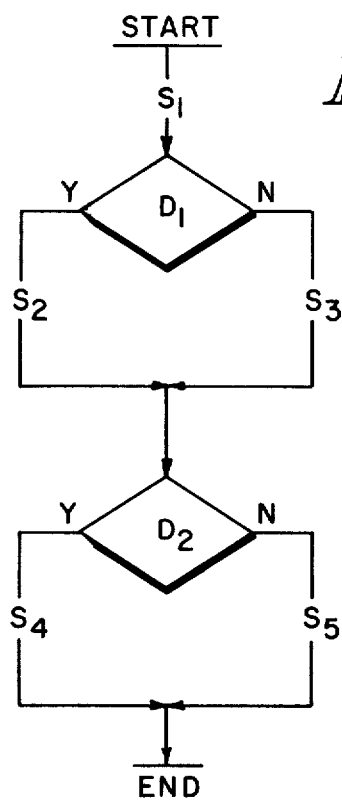
FIG. 5 is a flow diagram of a program with decision points only in series.

Referring to FIG. 5, there is provided in another example of a program, a plurality of statements $S_1, S_2, \ldots S_5$ and a plurality of decision points $D_1, D_2$. The decision points in this example are all coupled in series. With all of the decision points coupled in series, it is possible to see all of the instructions by simply following two paths regardless of the number of decision points. However, this is possible only if the user is aware that all of the decision points are in series. If the user is not aware that all of the decision points are in series, the user is forced to travel through $2^n$ paths where n is the number of decision points; again a potentially prohibitively larger number.

From the foregoing it can be seen that as long as the user is kept from seeing the program in the internal memories 15, 19, and 103, a reasonably complex program may be virtually impossible to copy. Keeping a user from seeing the program is accomplished most easily by fabricating all of the components of each of the embodiments described including the internal and auxiliary memories in a single integrated circuit package.

While several embodiments of the present invention are described, it is contemplated that numerous modifications to the embodiments described can and might well be made by those skilled in the art without departing from the spirit and scope of the present invention. For example, the adding circuits 5, 26 and 96 in FIGS. 1, 2 and 3 may be replaced by a number of other combining circuit means, such as substration and exclusive OR circuit means, among others. Accordingly, it is intended that the embodiments described be used only for purposes of illustrating the present invention, and that the scope of the invention be determined solely by the claims hereinafter provided and their equivalents.

What is claimed is:

1. A memory translating apparatus comprising:
   means for coupling said apparatus to an external source of memory addresses and an external memory;
   means storing a predetermined sequence of memory addresses;
   means responsive to said predetermined sequence and a signal corresponding to a first memory address received from said source, said first memory address from said source being a first memory address in said sequence, for providing an output corresponding to the next memory address in said sequence following said first memory address in said sequence; and
   means responsive to said output and a second memory address from said external source for addressing said external memory when said second memory address corresponds to said next memory address in said sequence.

2. An apparatus according to claim 1 comprising means for detecting a starting memory address from said source and means responsive to said detecting means for providing an initial address for addressing said external memory when a starting external memory address is detected.

3. An apparatus according to claim 1 wherein said storing and output providing means comprises an auxiliary memory circuit.

4. An apparatus according to claim 3 wherein said output providing means comprises a plurality of register means, means for selectively storing a signal corresponding to said next address from said auxiliary memory circuit means in said register means; and means for selecting the contents of said register means.

5. A memory translating apparatus comprising:
   means for coupling said apparatus to an external source of memory addresses and an external memory;
   means storing information corresponding to a predetermined sequence of memory addresses from said external source of memory addresses;
   means responsive to said information in said storing means and a signal corresponding to a first memory address received from said external source of memory addresses for providing an output corresponding to
   a memory address following said first memory address in said stored predetermined sequence of memory addresses; and
   means responsive to said output and a second memory address from said external source of memory addresses for addressing said external memory when said second memory address from said external source of memory addresses corresponds to said next memory address in said predetermined sequence.

6. A memory translating apparatus comprising:
   means for coupling said apparatus to an external source of memory addresses and an external memory;
   means storing information corresponding to a plurality of predetermined sequences of memory addresses which is responsive to a signal corresponding to a memory address previously received from said external source of memory addresses for providing an output corresponding to the next memory address following said previously received memory address in said plurality of sequences of memory addresses; and
   means responsive to said output and a memory address received from said source of external memory addresses for providing a memory address to address said external memory when said memory address received from said source of external memory addresses corresponds to said next memory address in said plurality of sequences of memory addresses.

7. A memory address translating apparatus comprising:
   a means for coupling said apparatus to an external source of memory addresses and an external memory;
   means for providing a signal corresponding to a memory address previously received from said external source of memory addresses;
   means for storing information corresponding to a plurality of predetermined sequences of memory addresses;
   means responsive to said signal and said information in said storing means for providing an output corresponding to the next memory address following said previously received memory address in said plurality of sequences of memory addresses;
   means responsive to said output and a memory address received from said source of external memory addresses for providing a memory address for addressing said external memory when said memory address received from said source of external memory addresses corresponds to said next-usable memory address in said plurality of sequences of memory addresses.

8. A method of addressing a program in an external memory using addresses from an external source of memory addresses comprising the steps of:
   coupling to said external source of memory addresses and said external memory an apparatus comprising an internal memory;
   storing a predetermined sequence of the memory addresses of said program in said internal memory;

providing external addresses from said source to said apparatus;
reading succeeding addresses in said predetermined sequence in response to succeeding addresses received from said external source;
providing, in response to a first address in said predetermined sequence and a signal corresponding to a first memory address received from said source, an output corresponding to the next memory address in said sequence following said first memory address in said sequence; and providing, in response to said output and a second memory address received from said source, an address for addressing said external memory when said second memory address from said source corresponds to said next memory address in said sequence.

* * * * *